United States Patent
He et al.

(10) Patent No.: US 10,581,164 B2
(45) Date of Patent: Mar. 3, 2020

(54) HYBRID MILLIMETER WAVE FEM ARCHITECTURE FOR MOBILE DEVICES

(71) Applicant: Futurewei Technologies, Inc., Plano, TX (US)

(72) Inventors: Xiaoyin He, San Diego, CA (US); Hanyang Wang, Abingdon (GB); Ping Shi, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/002,212

(22) Filed: Jun. 7, 2018

(65) Prior Publication Data

US 2019/0379119 A1    Dec. 12, 2019

(51) Int. Cl.
| | |
|---|---|
| *H04M 1/00* | (2006.01) |
| *H01Q 3/34* | (2006.01) |
| *H01Q 1/24* | (2006.01) |
| *H04B 1/3827* | (2015.01) |
| *H01Q 1/38* | (2006.01) |
| *H04W 88/02* | (2009.01) |

(52) U.S. Cl.
CPC .............. *H01Q 3/34* (2013.01); *H01Q 1/243* (2013.01); *H01Q 1/38* (2013.01); *H04B 1/3833* (2013.01); *H04W 88/02* (2013.01)

(58) Field of Classification Search
CPC ............ H01Q 3/34; H01Q 1/243; H01Q 1/38; H01Q 25/00; H01Q 3/36; H01Q 1/2258; H01Q 21/24; H01Q 7/10
See application file for complete search history.

(56) References Cited

U.S. PATENT DOCUMENTS

| | | | |
|---|---|---|---|
| 7,088,173 B1* | 8/2006 | Rozario .................... | H03F 1/02 330/124 R |
| 2004/0152415 A1* | 8/2004 | Anagnos .............. | H01O 25/002 455/25 |
| 2009/0128414 A1* | 5/2009 | Jeng ......................... | H01Q 9/26 343/700 MS |
| 2013/0241800 A1* | 9/2013 | Schlub ................... | H01Q 1/243 343/893 |
| 2014/0225805 A1* | 8/2014 | Pan ......................... | H01Q 1/20 343/893 |
| 2015/0188620 A1* | 7/2015 | Ponnuswamy .......... | H04B 7/10 375/267 |

(Continued)

OTHER PUBLICATIONS

Huo et al., "5G Cellular User Equipment: From Theory to Practical Hardware Design", IEEE Access, Jul. 18, 2017, vol. 5.

(Continued)

*Primary Examiner* — Barry W Taylor
(74) *Attorney, Agent, or Firm* — Vierra Magen Marcus LLP

(57) ABSTRACT

An electronic circuit for a mobile device, including: a power divider and a hybrid antenna array coupled to a transceiver via the power divider. The hybrid antenna array including a steering beam phased array antenna provided on the front-end module, and a fixed beam antenna provided on the front-end module or distributed on PCB. The fixed beam antennas can be used in space constrained areas of a mobile devices, such as those adjacent to a display on one side of the device, while larger steering beam phased array antennas are used on the back side of a device.

19 Claims, 7 Drawing Sheets

(56) References Cited

U.S. PATENT DOCUMENTS

2016/0218429 A1 7/2016 Klemes

OTHER PUBLICATIONS

Giordani et al, "A Tutorial on Beam Management for 3GPP NR at mmWave Frequencies", Apr. 4, 2018.
Bin Yu et al.,"A Novel 28 GHz Beam Steering Array for 5G Mobile Device With Metallic Casing Application",IEEE Transactions on Antennas and Propagation, vol. 66, No. 1, Jan. 2018,total 5 pages.
Bodhisatwa Sadhu et al.,"7.2 A 28GHz 32-element phased-array transceiver IC with concurrent dual polarized beams and 1.4 degree beam-steering resolution for 5G communication",2017 IEEE International Solid-State Circuits Conference (ISSCC),total 3 pages. Feb. 2017.
Wonbin Hong et al.,"Design and Analysis of a Low-Profile 28 GHz Beam SteeringAntenna Solution for Future 5G Cellular Applications",2014 IEEE MTT-S International Microwave Symposium (IMS2014),total 4 pages. Dec. 2014.
International Search Report dated Aug. 23, 2019, in PCT Patent Application No. PCT/US2019/089853, 10 pages.

\* cited by examiner

HYBRID MILLIMETER WAVE FEM ARCHITECTURE FOR MOBILE DEVICES

FIELD

The disclosure generally relates to an active antenna and front-end module (FEM) configuration for use in fifth generation (5G) wireless systems for mobile devices.

BACKGROUND

5G New Radio (5G NR) is an air interface for 5G wireless systems and comprises the radio frequency portion of the circuit between the mobile device and the active base station. 5G NR uses sub-6 GHz frequencies as well as millimeter wavelength (mmWave) frequencies which is generally considered the band of spectrum between about 30 GHz and 300 GHz. Steering beam phased arrays are commonly used in millimeter wave mobile communications in 5G New Radio and in short range communications in 801.11ad and 802.11ay. Steering beam phased array antenna solutions have the benefit of a narrow antenna beam and actively steerable antenna directions, as well as antenna array gain for both transmit and receiving, and spatial power combining gain on transmit (Tx). However, a phased array solution achieves the array gain and power gain at the cost of size (using more antenna array elements and more circuit elements). Space is at a premium in mobile devices and traditional steering beam phased array antenna solutions present issues in both physical footprint within a mobile device and in maintaining a link with a base station or access point.

BRIEF SUMMARY

According to one aspect of the present disclosure, there is provided a mobile device, including: a housing. The mobile device also includes a modem provided in the housing. The mobile device also includes a millimeter wave transceiver coupled to the modem in the housing. The mobile device also includes a hybrid antenna array coupled to the transceiver, the hybrid antenna array including at least one steering beam phased array antenna and at least one fixed beam antenna.

Implementations may include one or more of the following features. The mobile device may be configured such that the hybrid antenna array includes at least one vertically polarized steering beam phased array antenna or at least one horizontally polarized steering beam phased array antenna. The mobile device may be configured such that the hybrid antenna array includes at least one vertically polarized fixed beam antenna or at least one horizontally polarized fixed beam antenna. The mobile device may be configured such that the hybrid antenna array is provided in a single device. The mobile device may be configured such that the housing includes a first side having a display and a second side, where the at least one fixed beam antenna is provided in a region of the first side not including the display. The mobile device may be configured such that the fixed beam antenna is coupled to a transmission power amplifier and a receiving low noise amplifier both coupled to an antenna aerial, the transmission power amplifier having higher output power in comparison to an output power amplifier attached to array element of steering beam phased array antenna. The mobile device may be configured such that the steering beam phased array antenna includes a phase shifter, the output power amplifier, receiving low noise amplifier and switching elements coupling the phase shifter to the low noise amplifier or the output power amplifier. The mobile device may be configured such that the transceiver and the antenna array are provided in a single module.

According to another aspect of the present disclosure, there is provided an electronic circuit for a mobile device, including a power divider. The electronic circuit also includes a hybrid antenna array coupled to a millimeter spectrum transceiver via the power divider, the hybrid antenna array including at least one steering beam phased array antenna provided on a front-end module, and at least one fixed beam antenna.

Implementations may include one or more of the following features. The electronic circuit may be configured such that the fixed beam antenna includes a transmission power amplifier and a receiving low noise amplifier both coupled to an antenna port. The electronic circuit may be configured such that the at least one steering beam phased array antenna provided is provided on a front-end module, and the at least one fixed beam antenna is provided on the front-end module. The electronic circuit may be configured such that the steering beam phased array antenna includes a phase shifter, output power amplifier, receiving low noise amplifier and switching elements coupling the phase shifter to the low noise amplifier, the transmission power amplifier having higher output power in comparison to the output power amplifier attached to an array element of the steering beam phased array antenna. The electronic circuit may be configured such that the hybrid antenna array includes at least one vertically polarized steering beam phased array antenna or at least one horizontally polarized steering beam phased array antenna, and at least one vertically polarized fixed beam antenna or at least one horizontally polarized fixed beam antenna. The electronic circuit may be configured such that the at least one steering beam phased array antenna is provided on the front-end module, and the at least one fixed beam antenna provided on a second front-end module. The electronic circuit may be configured such that the hybrid antenna array includes at least one vertically polarized steering beam phased array antenna or at least one horizontally polarized steering beam phased array antenna; and the second front-end module may be configured such that the hybrid antenna array includes at least one vertically polarized fixed beam antenna or at least one horizontally polarized fixed beam antenna. The electronic circuit may be configured such that the at least one steering beam phased array antenna is provided on a front-end module, and the at least one fixed beam antenna provided on a PCB board. The electronic circuit may be configured such that the hybrid antenna array includes at least one vertically polarized steering beam phased array antenna or at least one horizontally polarized steering beam phased array antenna, and the fixed beam antenna provided on a PCB board includes at least one vertically polarized fixed beam antenna or at least one horizontally polarized fixed beam antenna.

According to still one other aspect of the present disclosure, there is provided an electronic circuit provided in a module, including a millimeter wave spectrum modem. The electronic circuit also includes a millimeter wave transceiver coupled to the modem. The electronic circuit also includes a hybrid antenna array coupled to the transceiver, the hybrid antenna array including at least one steering beam phased array antenna and at least one fixed beam antenna.

Implementations may include one or more of the following features. The electronic circuit may be configured such that the fixed beam antenna includes a power amplifier and a low noise amplifier, the power amplifier having higher output power in comparison to power amplifier attached to array element of steering beam phased array antenna. The electronic circuit may be configured such that the circuit is provided in a housing, the housing includes a first side having a display and a second side, where the at least one fixed beam antenna is provided in a region of the first side not including a display.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

DETAILED DESCRIPTION

The present disclosure will now be described with reference to the figures, which in general relate to an antenna and front-end module (FEM) configuration for use in fifth generation (5G) wireless systems for mobile devices or in other mobile millimeter wave communication systems including, but not limited to 802.11ad and 802.11 ay. A front-end, as used herein, may comprise one or multiple Front End Modules (FEM), where a module is considered any physical package for a set of elements including at least a transceiver and antenna arrays. Each module may include one or more steering beam phased array antennas, hybrid antenna arrays and one or more fixed beam antennas. The technology provides a front-end module which combines one or more of phased array antennas, fixed beam antennas, and hybrid antenna arrays. An mmWave and antenna front-end with different antenna technologies, each manufactured with different semiconductor processing technologies, allows the disclosed solution to meet link budgets required for 5G or other technologies implemented in the mmWave spectrum, while maintaining a low cost for the overall solution. The solution uses the fixed beam antenna(s) wherever the performance is limited due to the space, and phased array antennas where space is not so limited. As described herein, a hybrid antenna array may be provided on in a single module (an "Antenna in a Package" (AIP)), or multiple modules (AIP), or in modules (AIP) with antennas on a Printed Circuit Board (PCB) board of a mobile device.

To deal with signal stations impairments in the mmWave spectrum, 5G User Equipments (UEs) and mmWave Base Stations (gNB) generally establish highly directional transmission links, typically using phased array antennas. Directional links, however, require fine alignment of the transmitter and receiver beams, achieved through a set of operations known as beam management. In addition, phased array antennas require multiple antenna elements per beam in order to increase the gain and provide the steering of the input and output beam. Phased array antennas require unimpeded exposure to areas of a mobile device housing so there is no interference with their beam input and output. This makes it unattractive to use phased arrays in mobile devices where one side of the device is occupied almost entirely by a display.

Figure 2:
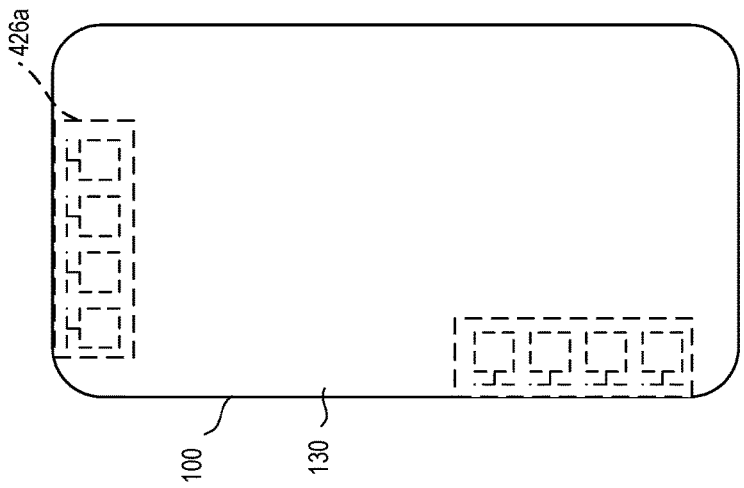
FIG. 2 illustrates a second, back side of the mobile device of claim 1 and a front-end module and antenna structure positioned relative to the second side of the device.

A major challenge in applying mmWave to mobile devices is the high attenuation in mmWave propagation. In mmWave bands, power amplifier output power and efficiency are relatively low, and the noise figure of low noise amplifiers is generally high. The present technology provides a FEM including a hybrid antenna which allows one or more fixed beam elements to be positioned in space restricted area on, for example, a display side of a mobile device, while phased array antennas which are larger than the fixed beam antennas may be positioned in less-space restricted areas of the mobile device. This is illustrated in FIGS. 1 and 2.

Figure 1A:
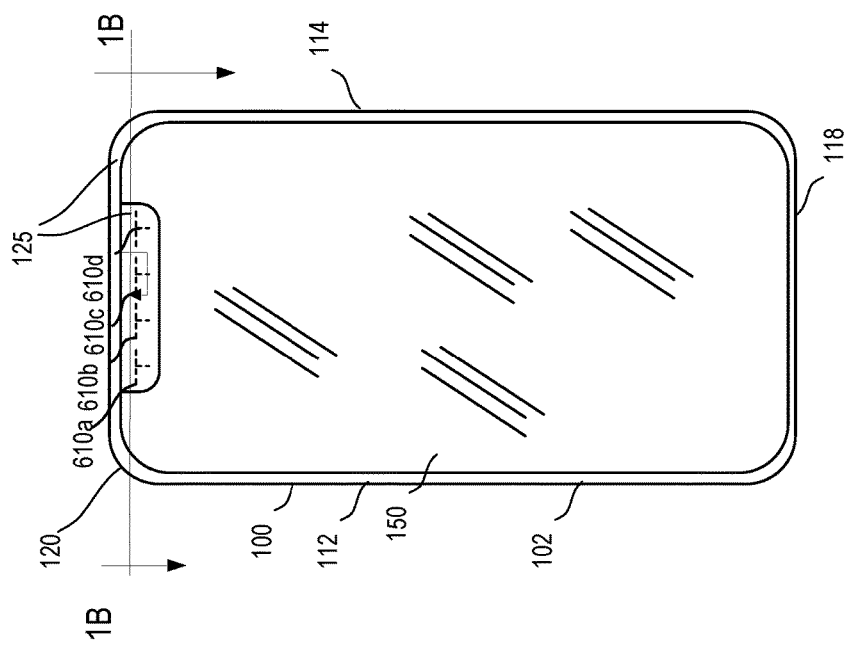
FIG. 1A illustrates a first, front side of a mobile device and an antenna structure positioned in a limited non-screen area of the device.
Figure 1B:
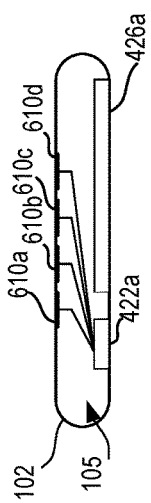
FIG. 1B is a cross-section along line 1B-1B in FIG. 1A illustrating the interior of a mobile processing device.

FIG. 1A illustrates a mobile processing device 100 having a housing 102. FIG. 1 illustrates a first, front side 120 of the mobile processing device 100 having a display area 150. The first, front side 120 is bounded by four edge sides 112, 114, 116, 118 which may be formed to have an arcuate cross section as illustrated in FIG. 1B. Edge sides 112, 114, 116, and 118 may have a planar cross-section in another alternative. The display area 150 may comprise a touch sensitive display commonly used in mobile processing devices. The first, front side 120 includes one or more non-display areas 125 which are next to and bound the display area 150. The second, back side 130 illustrated in FIG. 2 is generally comprised of a non-display area. The second, back side 130 is bounded by the four edge sides 112, 114, 116, 118 and may formed of the same material or different material than the second, back side 130. The housing 102 includes in interior cavity 105 which houses device components such as those illustrated in FIG. 3.

FIG. 1B is a cross-section along line 1B-1B in FIG. 1A. FIG. 1B in conjunction with FIG. 1A and FIG. 2 illustrates the placement of fixed beam antennas and phased array antennas. Various embodiments of the hybrid antenna array are disclosed with respect to FIGS. 4-7. One such hybrid antenna array illustrated in FIG. 7 includes fixed beam antennas 422/424 and phased array antennas 426/428. As illustrated in FIG. 1B and FIG. 2, one or more mmWave phased array antennas may be placed abutting or in close proximity to the second, back side 130 of the mobile processing device 100 in a non-display region. As illustrated in FIG. 1B, the phased array antenna is provided in a module or package 422a abutting a surface of the interior cavity opposite the back side 130 of the housing. Fixed beam antennas 424 include one or more antenna elements 610a-610d. As illustrated herein, fixed beam antennas 422/424 may be provided in the non-display areas 125 abutting or in close proximity to the first, front surface of the mobile processing device 100. In this illustration, the antenna elements 610a-610d are positioned in the interior cavity 105 abutting or in close proximity to the front side 120 of the housing beneath the non-display area 125 (which is a region of the first side not including the display). The fixed beam antennas elements 610a-610d comprises one or a few antenna elements with a generally smaller in footprint than larger phased array antennas. The combination of such fixed beam antennas and steering beam phased arrays into a hybrid structure is advantageous for use in a 5G NR device and other types of millimeter wave mobile communication devices since it allows placement of the fixed beam antenna element in space constrained regions of the device housing while allowing the use of phased array antennas in less-space constrained areas of the device.

Figure 3:
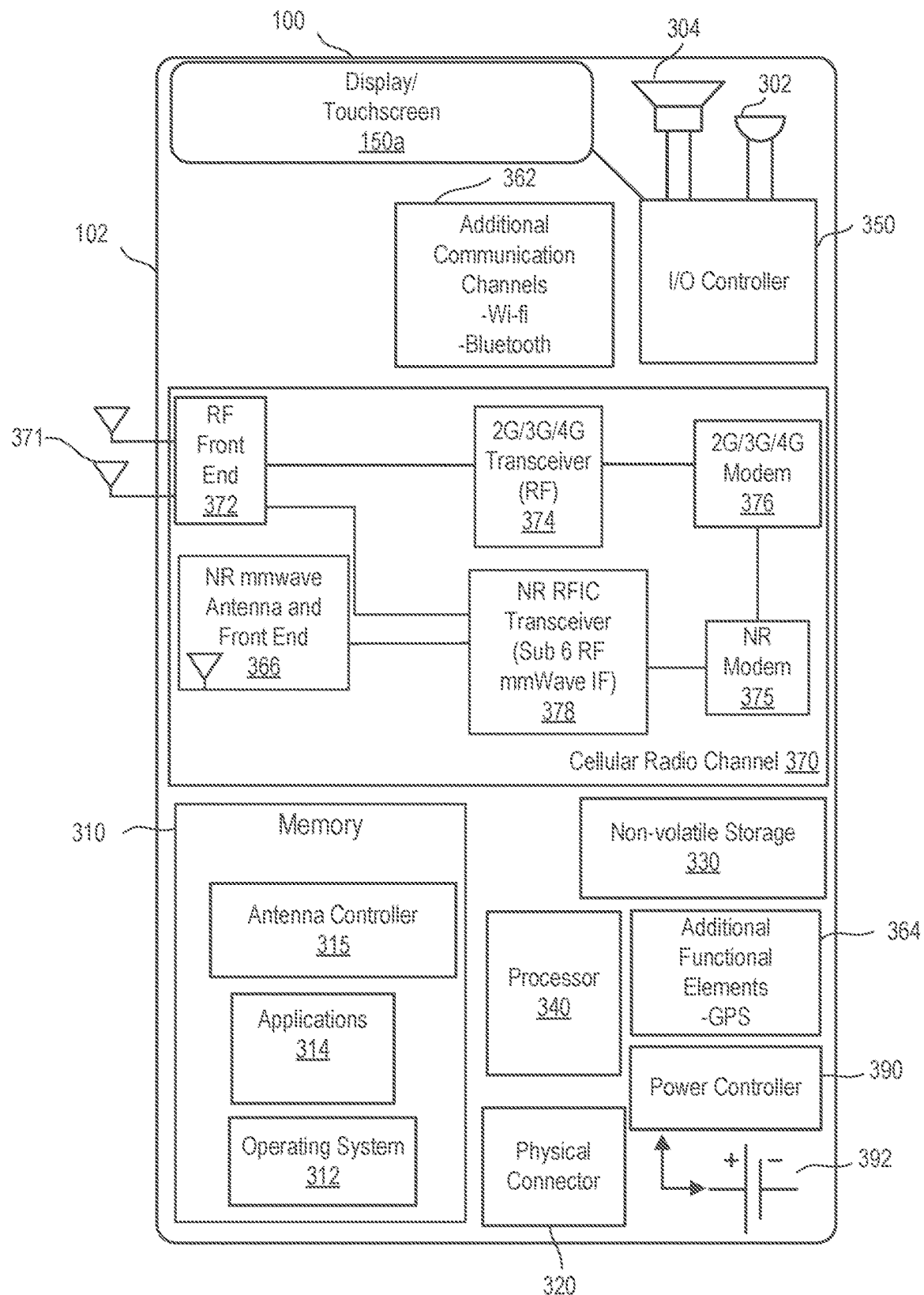
FIG. 3 is a block diagram illustrating components of the mobile device of FIGS. 1 and 2.

FIG. 3 depicts an example of typical architecture for a 5G NR mobile device. The mobile processing device 100 has memory 310, a physical connector 320, processor 340, an input/output (I/O) controller 350, a cellular radio channel 370, and power controller 390. Each of these components is connected through one or more system buses (not shown).

Memory 310, coupled to processor 340, includes the mobile processing device's operating system 312, applications 314, and antenna controller 315. Memory 310 can be any variety of memory storage media types, including non-volatile and volatile memory. The operating system 312 handles the different operations of the mobile processing device 100 and may contain user interfaces for operations, such as placing and receiving phone calls, text messaging, checking voicemail, and the like. The applications 314 can be any assortment of programs, such as a camera application for photos and/or videos, an address book application, a calendar application, a media player, an internet browser, games, and the like.

The operating system 312 manages the hardware of the mobile processing device 100, including hardware such as the display/touchscreen 150a (occupying display area 150 in FIG. 1), speaker 104, and microphone 302. The operating system 312 also manages software (i.e. applications 314) on the mobile processing device 300 for performing tasks requested by the user and handling incoming data. This occurs through the operating system's control and allocation memory (i.e. RAM), system tasks, system resources, files systems, and the like. The processor 340 executes operations for the mobile processing device according to this control and allocation.

The power controller 390 of the mobile processing device 100 allocates power from the mobile processing device's power supply 392 to the circuitry for different mobile processing device components used to operate the mobile processing device 100 and its different features.

Additionally, the physical connector 320 can be used to connect the mobile processing device 100 to an external power source, such as an AC adapter or powered docking station.

The mobile processing device 100 also contains a cellular radio channel 370 for receiving and transmitting data, such as phone calls, text messages, email, webpage data, and the like. Cellular radio communication can occur through any of the standard network protocols of mobile processing device communication (i.e. GSM, PCS, D-AMPS, UMTS, CDMA, WCDMA, LTE, and the like.). The mobile processing device 100 may also contain additional communication channels 362, such as Wi-fi, Bluetooth, and the like, for receiving and transmitting data as well. The mobile processing device 100 may have additional functional elements for communication 364, such as GPS. Each of the described communication mediums is accessed via the mmWave and antenna front-end 366 or RF front-end 372 with antenna 371 on the mobile processing device 100. The communication mediums for operations of the mobile processing device 100 are not limited to the mediums described and can include any other communication mediums known in the art.

It should be recognized that any suitable processing device, mobile or otherwise, may implement the present technology. Hence, although FIG. 3 illustrates a mobile device, similar components to those illustrated in FIG. 3 may be provided in a general-purpose processing device such as a desktop computer, laptop computer, or server.

The cellular radio channel 370 is illustrated herein as a combination of legacy 2G/3G/4G subsystem and a 5G communication subsystem. It comprises a 2G/3G/4G modem 376, a 2G/3G/4G transceiver 374 (which may be embodied in an LTE RF integrated circuit (RFIC)) coupled to modem 376 and a sub-6 GHz RF front end 372. The 5G subsystem includes a NR modem 375 and a NR transceiver 378 coupled to NR modem 375 and antenna and front-end 366. The 2G/3G/4G subsystem provides communication services for compatibility with legacy systems.

A NR modem 375 provides and receives data in digital baseband via an NR transceiver 378. The digital baseband is provided to the NR Modem 375 by the processor 340 and processed for transmission through the mmWave and antenna front-end 366. Similarly, data is received by the mmWave and antenna front-end 366 and provided to the transceiver for conversion to baseband by the NR modem 375. NR modem 375 and 2G/3G/4G modem share a connection to allow data to be provided through either channel if connectivity to NR frequencies is lost. The NR transceiver transmits and receives data using either mmWave frequencies or legacy sub-6 GHz frequencies, or both, and is therefore connected to both the sub-6 GHz RF front end 372 and the mmWave and antenna front-end 366. In some implementations, 2G/3G/4G transceiver 374 and NR transceiver 378 can be physically combined into single chip or module, while 2G/3G/4G modem 376 and NR modem 375 can be physically combined into single chip or module.

The mmWave and antenna front-end 366 may include fixed beam antennas, phased array antennas or hybrid antenna arrays as described herein. Each front-end 366 may comprise one or multiple FEMs. Each module may include one or more steering beam phased array antennas, hybrid antenna arrays and one or more fixed beam antennas.

Also shown in memory 310 is an antenna controller 315. Antenna controller 315 may perform one or more functions of beam steering for the phased array components of the present technology as well as antenna selection and power management functions as described herein.

Figure 4:
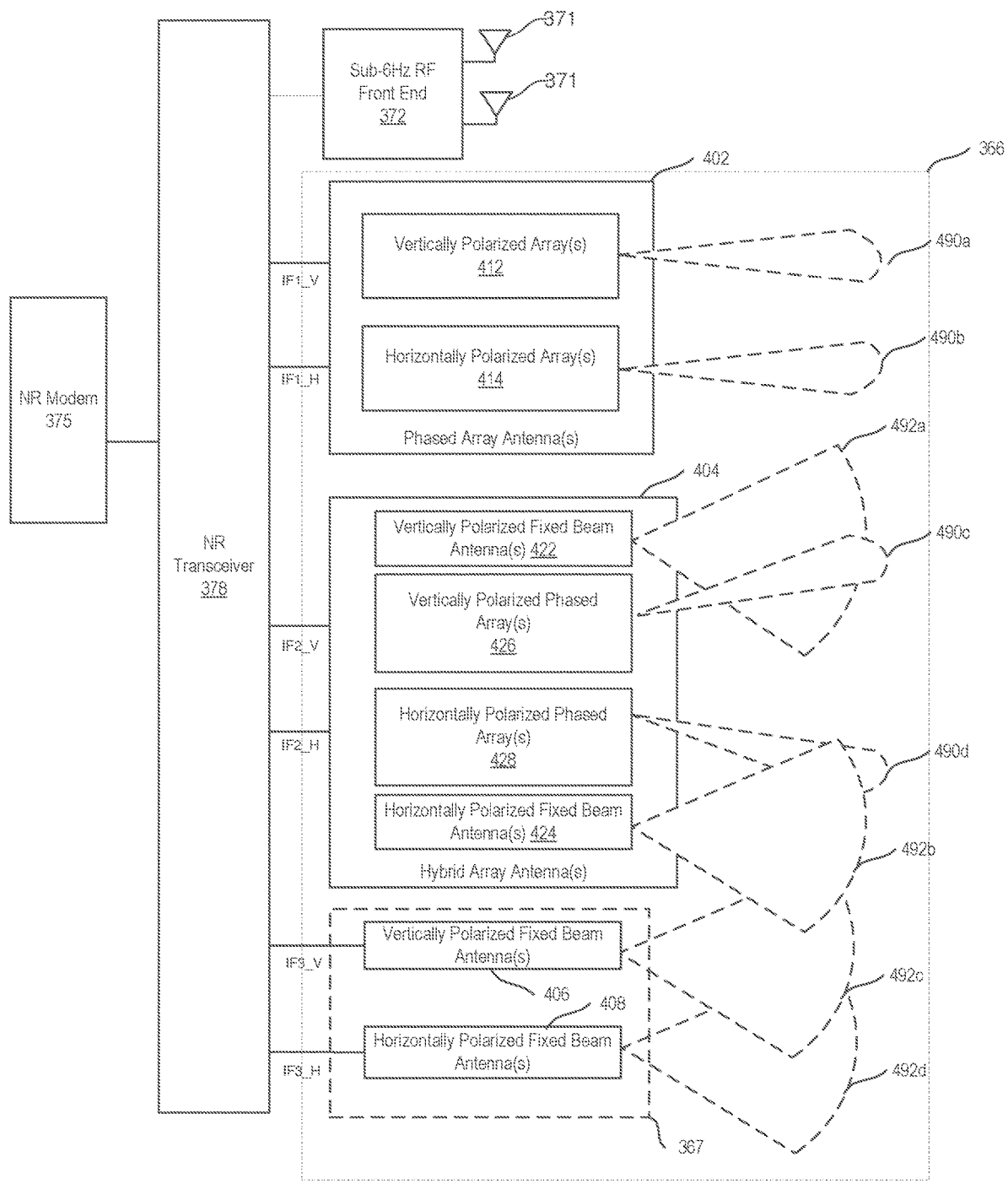
FIG. 4 is a block diagram of a front-end module and antenna structure in accordance with the present technology.

FIG. 4 illustrates one configuration of the mmWave and antenna front-end 366, which may include one or more fixed beam antennas 367, one or more phased array antennas 402 and/or one or more hybrid antenna arrays 404. Again, the mmWave and antenna front-end 366 may comprise one or multiple Front End Modules (FEM), where a module is considered as any physical package for a set of elements including a transceiver and antenna arrays, and each module may itself include one or more steering beam phased array antenna 402, hybrid antenna array 404 and one or more fixed beam antennas 367.

As illustrated in FIG. 4, NR transceiver 378 is coupled to one or more antenna arrays or modules. A sub-6 GHz RF front-end 372 handles transmissions at frequencies in the sub-6 GHz band, as described above. In the configuration of FIG. 4, a phased array antenna 402, hybrid antenna array 404 and two fixed beam antennas 406 and 408 are shown. In various embodiments, the mmWave and antenna front-end 366 may include one or more of antennas 402, 404, 406 and 408. The fixed beam antennas 406 and 408 may form the beam antennas 367 shown in FIG. 4. The phased array antenna 402 may include one or more vertically polarized arrays 412 and one or more horizontally polarized arrays 414. It will be understood that there may be multiple phased array antennas 402 in any mmWave and antenna front-end 366.

Similarly, there may be one or more vertically polarized fixed beam antenna or antennas 406 and one or more horizontally polarized fixed beam antenna or antennas 408.

Hybrid antenna array 404 may include a vertically polarized fixed beam antenna or antennas 422, horizontally polarized fixed beam antenna or antennas 424, vertically polarized phased array or arrays 426 and horizontally polarized phased array or arrays 428.

Figure 5:
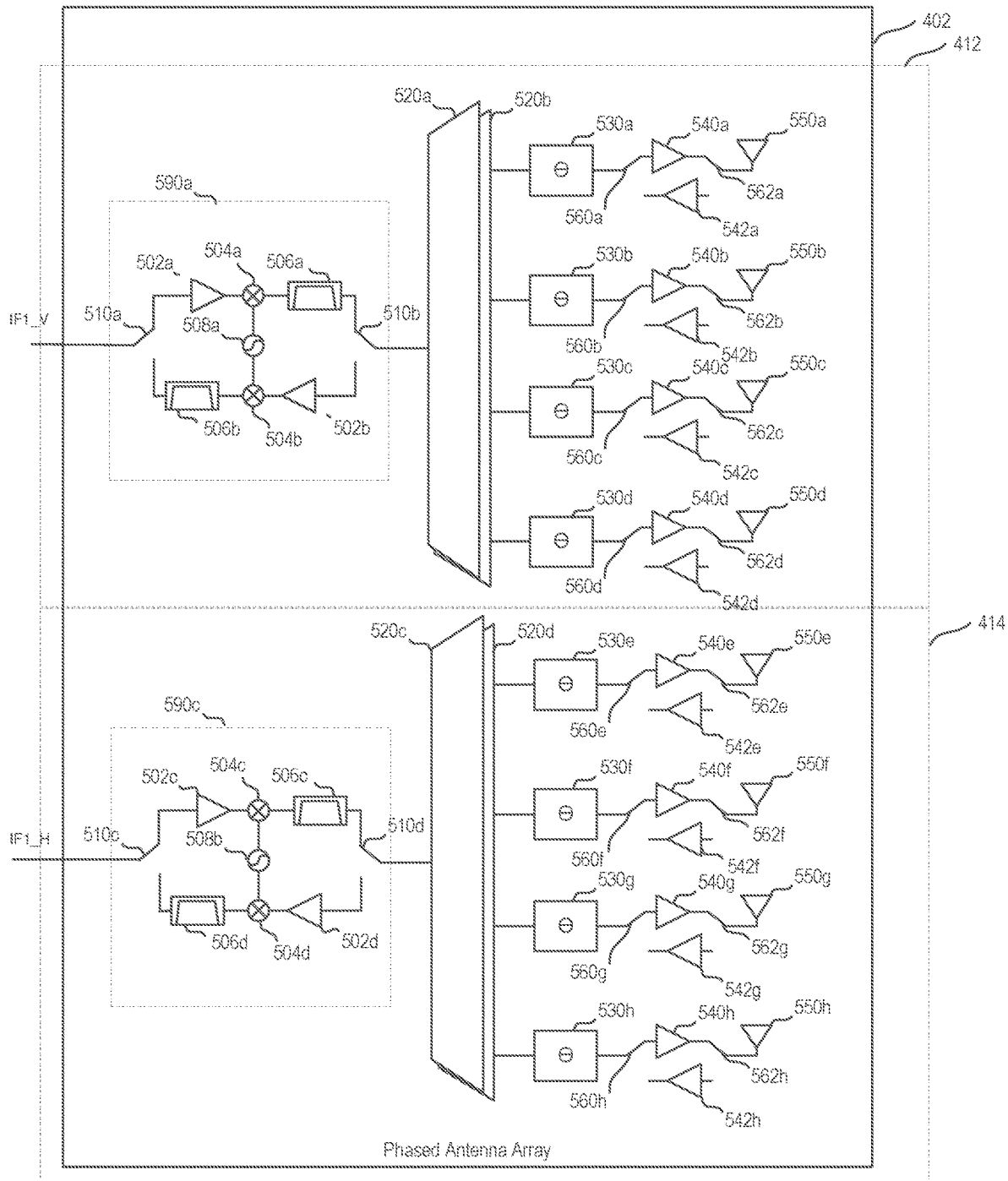
FIG. 5 is a schematic diagram illustrating a steering beam phased array structure.

In one aspect, mmWave communication is performed directionally using the phased array antenna which saves power and achieves good coverage on one side of the device. Steering beam phased array antennas provide this directional capability, provide adequate array gain for both transmit and receive channels, and provide good power gain for transmit channels. As illustrated in FIG. 4, phased arrays produce relatively focused beams 490a-490d. It should be understood that the beams shown are for illustration only, are not to scale relative to the beams formed by fixed beam antenna and do not represent all the beams which may emanate from the phased array antennas illustrated. As shown in FIGS. 5 and 6, each steering beam phased array antenna is composed multiple radiating elements, each with a phase shifter. Beams are formed by shifting the phase of the signal emitted from each radiating element to provide constructive/destructive interference thereby steering the beam in the desired direction. The signal is amplified by constructive interference in the main focus direction and the beam sharpness is improved by the destructive interference. The beam direction is electronically adjustable under the control of the antenna controller 315. Hence, the phases arrays form directional millimeter beams which provides good spatial energy efficiency and receive sensitivity, but they suffer poor spherical coverage in mobile device applications and require the antenna controller to implement beam tracking techniques with a base station.

Phased arrays are relatively large in physical size and include multiple circuit elements. A phased array solution places less demand on the performance, and CMOS, SOI, and SiGe technology can be used in RF front-end to meet the link budget constraint used for current mobile devices. Thus, phased arrays and/or hybrid arrays (a portion of which, as discussed below, includes a phased array) may be used on the second or back side of a mobile device, where the size is not a constraint.

To receive the radio signal on the first, front (display) side or in other spatial limited side of a mobile device, one or more fixed beam antennas 422, 424, 406, 408 are used. As illustrated below, the fixed beam antenna(s) may be provided as a branch from an NR transceiver 378 (as with antenna 406 and antenna 408) or as a branch from the phased array antenna 426 (as illustrated by antenna 422). The fixed beam antennas provide a wide and fixed beam (illustrated as beams 492a-492d) and can be arranged to cover spherical space through combination of multiple beams. The fixed beam antennas can be configured either in single or dual polarization. While the antenna aperture is very small, fixed beam antenna which comprises of one or a limited number of elements do not have the advantage of high antenna combining gain and power gain from a steering beam phased array. Therefore, a high-power amplifier is used to achieve similar EIRP (Effective (or Equivalent) Isotropic Radiated Power). For example, a power amplifier with a 1 dB compression point of 20-28 dBm may be used to replace the commonly used CMOS power amplifier with P1 dB of 11-16 dBm in a steering beam phased array. Also, since no or limited array gain is available on the receive channel, a low noise amplifier with a lower noise figure of 1-3 dB, for example should be used (to replace a low noise amplifier with higher noise figure of 4-7 dB). However, operation of the fixed beam antenna is simpler because no phase shifter is associated with antenna, thus no beam related calibration is needed. It has also advantage of low complexity in beam management of mmWave communication, especially in high speed mobile environment and in applications with high angular speed change.

FIG. 5 is a schematic diagram illustrating one embodiment of a phased array antenna 402. Two phased arrays 412 and 414 are shown, one for each polarization, but each polarization may include more than two phased arrays. Array 412 is configured to be a vertically polarized array and array 414 is configured as a horizontally polarized array. Reference numbers having the same integer value represent like parts in this description. Inputs IF_1 and IF_2 represent intermediate frequency signals output from the NR transceiver 378. IF_1 and IF_2 are intermediate frequency signals in a superheterodyne architecture although it will be understood that the principles of the present technology may be applied to other types of architectures such as a direct conversion architecture, where RF or baseband signal will be supplied to FEM depending on the partition of mixers (upconverter/downconverter).

Each vertically polarized array includes an initial transmit and receive mixing stage comprising switches 510a and 510b which control switching between transmit elements of amplifier 502a, mixer 504a and band pass filter 506a, and receive channel elements of amplifier 502b, mixer 504b and band pass filter 506b. A local oscillating (LO) signal (generated by a voltage controller oscillator 508a) is coupled to mixer 504a and 504b. Similar components of switches 510c, 510d, amplifiers 502c, 502d, multipliers 504c, 504d, LO signal from voltage controller oscillator 508b and band pass filters 506c, 506d make up the mixing stage of array 414.

In the system as illustrated, the analog baseband is converted from the modem as continuous time analog signals and is subsequently filtered to reject unwanted high frequency spectral contents. The filtered signals are used to modulate a high frequency carrier signal. In a superheterodyne transmitter, the modulation takes place at an Intermediate Frequency (IF) which is different from the final RF carrier frequency. Then the modulated signal is frequency-converted by a mixer stage 590a, 590c. Superheterodyne transmitters utilize the band-pass filter (506a, 506c) after the up-conversion mixer stage since the mixer produces undesired spectral contents. In a direct conversion transmitter, the baseband signals are converted to RF signal in one step, where the IF1, IF2 will be the baseband signal correspondingly. It is understood that mixer stage could be integrated into transceiver or into the front-end module, depending on the architecture, there are one or two mixer stages. The receive side is similar to transmit side, with signal travels from antenna to modem.

One or more power dividers 520a-520d are coupled between the mixing stage and the array stage. In one embodiment, power divider 520b is shown as coupled to four transmit and receive elements, each comprising phase shifters 530, transmit power amplifiers 540, receive low noise amplifiers 542 and antenna 550. (Additional elements may be connected to power dividers 520a and 520c but are omitted in the drawing for clarity in illustration. Optionally, power dividers may comprise switches under the control of the antenna controller 315.) Switches 560 and 562 select between the transmit and receive path of each array element. For example, phase shifter 530a, switch 560a, low noise amplifier 540a, switch 562a and antenna 550a comprise a transmit path for one element and antenna 550a, switch 562a, low noise amplifier 542a, switch 560a and phase shifter 530a comprise a receive path for the same element. Phase shifter can be implemented separately for transmit and receive path in other implementations, correspondingly switch 560 will move to location between power divider 520 and phase shifter 530. Four elements are illustrated for each of the vertically polarized array 412 and horizontally polarized array 414. In one example, components in the phased array are manufactured from CMOS fabrication techniques to provide a noise figure of 6-7 dB for the receive path consisting of switches 562, low noise amplifiers 542 and switch 560, and a P1 dB output power of 14-15 dBm (at P1 dB compression point) with thus a total P1 dB output power of 20-21 dBm (for a 2×2 four element array). The noise figure and output power number are provided for example purposes only.

Figure 6A:
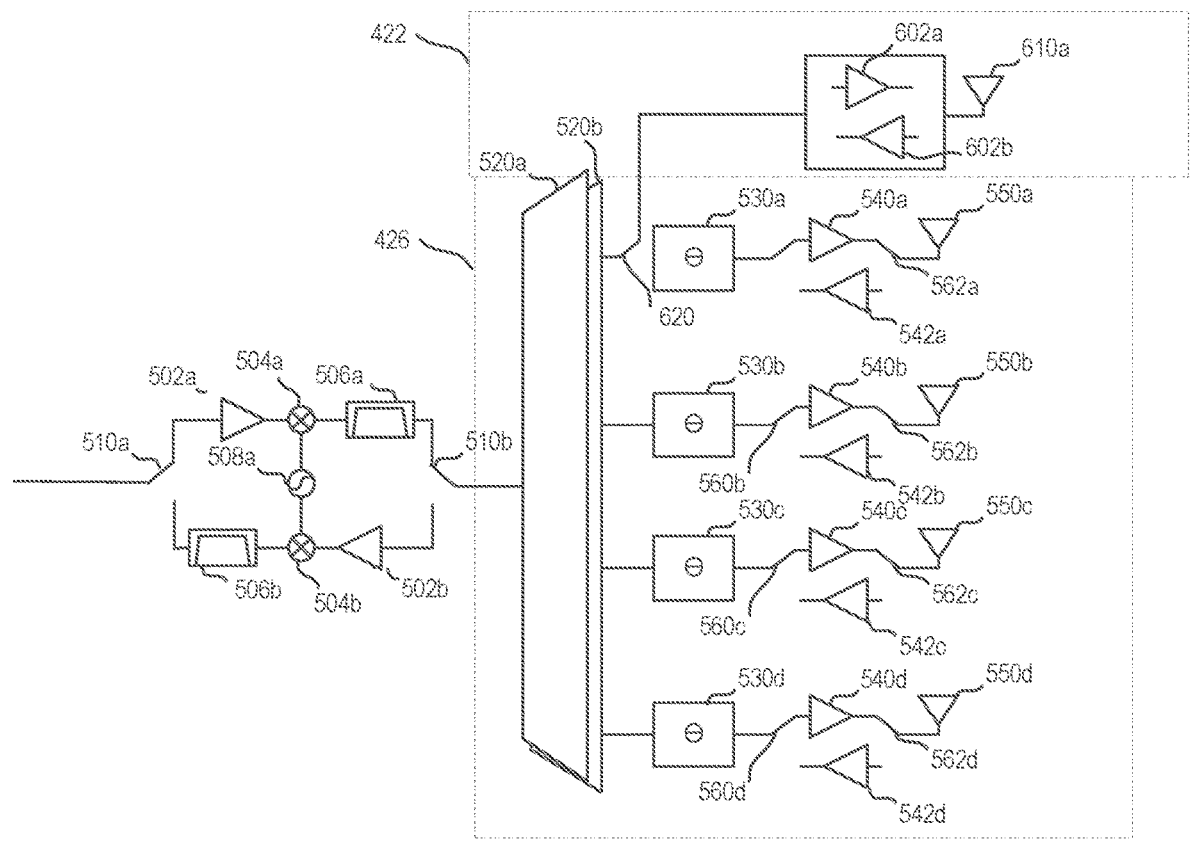
FIG. 6A is a schematic diagram illustrating a first hybrid phased array and fixed beam single element antenna structure.

FIG. 6A shows one embodiment of the vertically polarized hybrid front-end module and hybrid antenna array including a fixed beam antenna 422 and a steering beam phased array 426. Here mixing stage is included in the front-end module. As illustrated in FIG. 6A, the steering beam phased array 426 includes the same elements illustrated in FIG. 5 with the exception that a switch 620 is provided between the phase shifter 530a of the first array element and the power divider 520b, and a fixed beam antenna 422 is branched from the power divider 520b via switch 620. It should be understood that any one or more of the four elements in the steering beam phased array 426 may be switched with a corresponding fixed beam antenna (thereby providing up to four fixed beam antennas) although only fixed beam antenna 422 is shown. Each fixed beam antenna includes switches to select transmit path or receive path, a power amplifier 602a and low noise amplifier 602b, coupled to each antenna element 610a. Tx/Rx signals from fixed beam antenna can be routed from/to the phased array antenna module and thus to the mmWave front-end and the existing mmWave front-end circuit can be reused. In another embodiment, switch 620 is replaced by a power divider, enabling simultaneous operation of steering beam phased array 426 and fixed beam antenna 422. In another embodiment, switch 620 is placed between switch 562 and antenna 550, providing extra gain for path with fixed beam antenna 422.

Figure 6B:
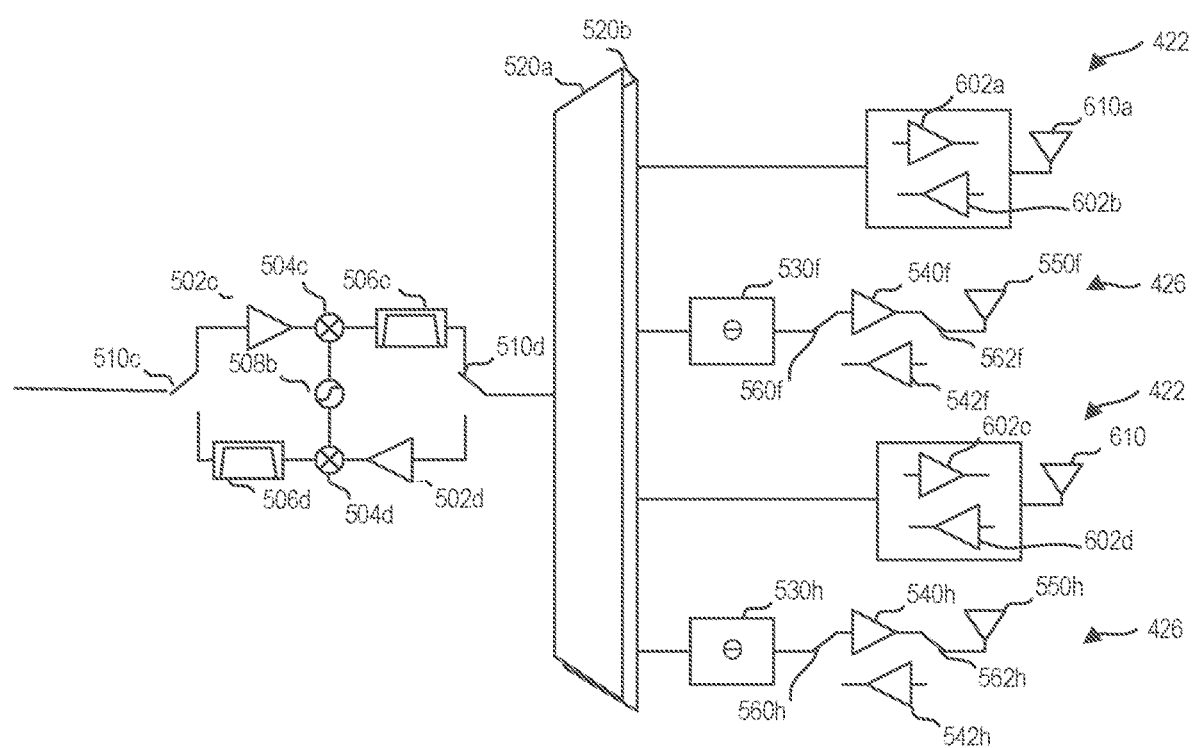
FIG. 6B is a schematic diagram illustrating a second hybrid phased array and fixed beam antenna structure.

Another alternative of a hybrid antenna array is illustrated in FIG. 6B. As shown therein. Two fixed beam antennas 422 are combined with phased array antennas 426 and are directly coupled to the power divider 520b. The power divider 520b is utilized to direct signals to and from the phased array and the fixed beam antennas based on the control of the antenna controller 315.

In each of the embodiments of FIGS. 6A and 6B, a power amplifier with higher max output power and low noise amplifier with a lower noise figure are used. mmWave signals are routed to and from the phased array antenna module. Either single or dual polarization may be used.

To overcome the gain loss of fixed beam antenna, a stage of a low noise amplifier 602b and power amplifier 602a is used to lower the noise figure and boost output power. It is desired to have the low noise amplifier noise figure lower enough to compensate the noise figure difference between a phased array antenna solution and fixed beam antenna solution. The same principle is applied for power amplifier.

Currently, SiGe HBT, or GaAs pHEMT based fabrication technologies are used for the power amplifier and low noise amplifier operating in mmWave band. As a result the conducted power could be 6-10 dB higher, and noise figure could be 3 dB lower. PA fabricated using SiGe HBT or GaAs pHEMT technology can achieve much higher (6 dB or more) output power than the using CMOS, and low noise amplifiers can achieve much lower (3 dB or so) noise figure when fabricated on SiGe or GaAs instead of on CMOS.

Figure 7:
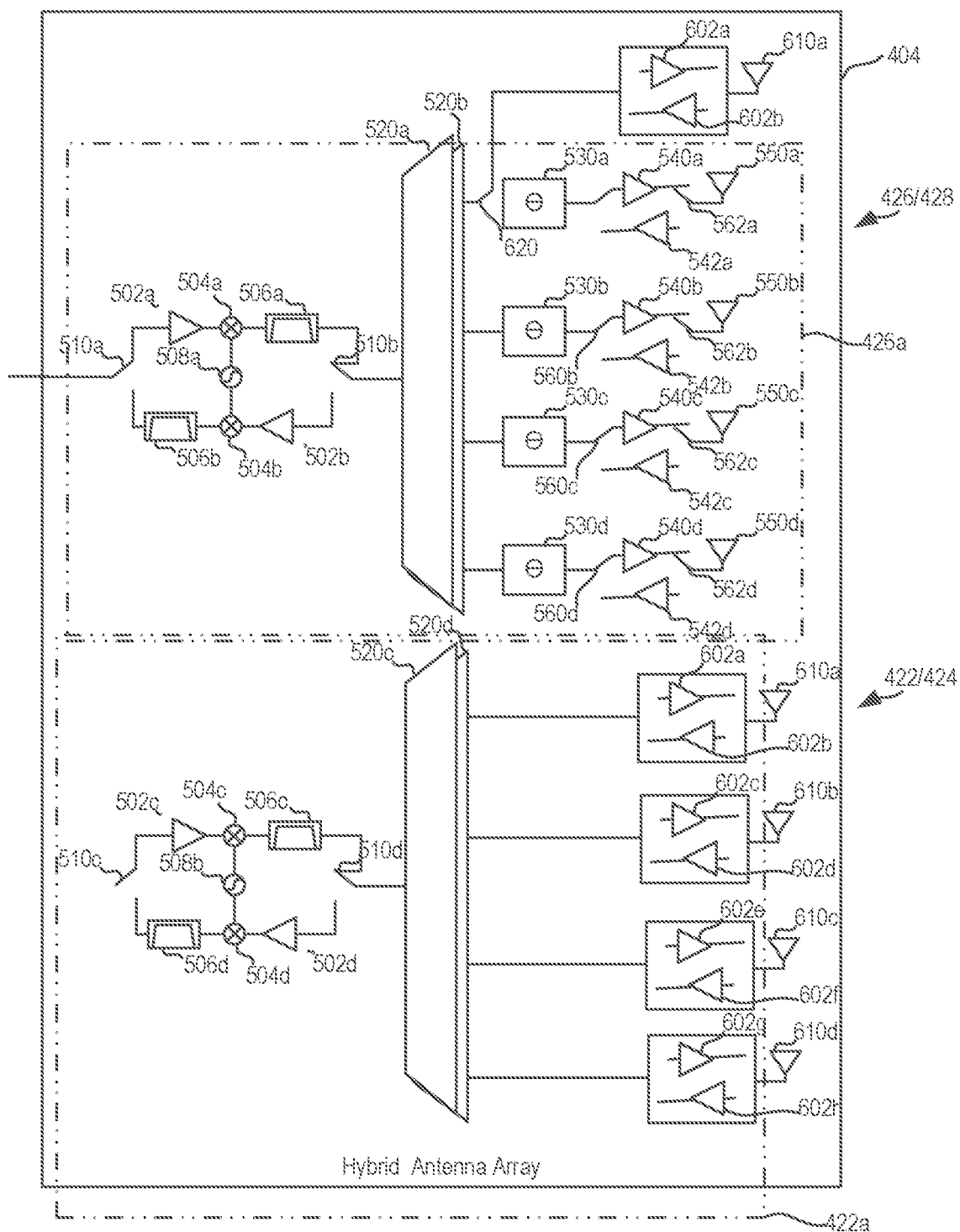
FIG. 7 is a schematic diagram illustrating a third hybrid phased and fixed beam structure.

In one example of the power amplifier 602a, GaAs pHEMT manufacturing technology is used to provide a power amplifier with an output power of 24 dBm and a peak Power Added Efficiency (PAE) over 50%. A corresponding low noise amplifier 602b has a noise figure of 1.8 dB when manufactured with pHEMT and a switch (such as switch 620) has an insertion loss of 1.2 dB (a total noise figure of 3 dB). This compares to a combined noise factor of 6-7 dB for a low noise amplifier and switch, and a P1 dB of 14-15 dBm with a peak PAE 30% for a power amplifier based on CMOS technologies FIG. 7 illustrates another embodiment of a hybrid arrangement. In FIG. 7, one or more single element antennas (422/424) may be coupled to a power divider 520b and a mixing stage comprising switches 510c, 510d, power amplifiers 502c, 502d, multipliers 504c, 504d, signal reference 508b and band pass filters 506c, 506d. One or more phased array antennas (426/428) may be coupled to a power divider 520b and a mixing stage comprising switches 510a, 510b, power amplifiers 502a, 502b, multipliers 504a, 504b, signal reference 508a and band pass filters 506a, 506b. Bounding line 426a represents a physical package which may contain a phased array antenna. Bounding line 422a represents a physical package which may contain a fixed beam antenna or antenna array. It will be understood that the phased array antenna and fixed beam antenna may be provided in a single module 404 as illustrated.

In operation, a fixed beam antenna is treated equally as a phased array antenna, following beam management protocol, but its operation is simpler. A fixed beam antenna can be used for beam searching with the single beam from the fixed beam antenna. There is no receive beam adjustment or transmission beam training when fixed beam is used. The illustrated fixed beam antennas can be configured to work simultaneously with phased array antenna or another fixed beam antenna, with different polarizations or the same polarization.

For device designs where sufficient large dielectric antenna window is available, a phased array antenna may be used to achieve better output power, lower noise figure, and lower cost. While for other cases where very little space is left for mmWave antenna, mmWave antenna with small aperture is preferred to provide coverage for those intended direction. Fixed beam antenna has smaller antenna aperture and are ready to be placed in placed with a lot of constraint. A combination of the fixed beam antenna and phased array antenna achieve a good balance between the performance and cost. The present technology achieves the benefits of both architectures: a small antenna aperture (~λ/4) for easy antenna placement with space-challenged mobile devices designs; and a large antenna aperture (~λ for 2×2 arrays)

with high array gain when space is available. The technology provides an optimal tradeoff benefit of cost and performance since CMOS is inexpensive but low performance and SiGe/GaAs is generally more costly but provides higher performance devices. The technology allows reuse of current mmWave beam management with phased array antennas, reducing the beam searching and alignment time, while simplifying the beam-tracking with fixed beam antenna.

As will be appreciated, one or more combinations of the embodiments of FIGS. 5-7 are considered within the scope of the present subject matter including the following elements coupled to, but not limited to the NR transceiver:

(1) A phased antenna array having two to many elements with polarization;

(2) A phased antenna array having two to many elements with horizontal polarization;

(3) A phased antenna array having two to many elements with vertical polarization;

(4) A phased antenna array having two to many elements with vertical polarization combined with a phased antenna array having two to many elements with horizontal polarization;

(5) One to many fixed beam antennas coupled directly to the NR transceiver with polarization;

(6) One to many fixed beam antennas coupled directly to the NR transceiver elements with horizontal polarization;

(7) One to many fixed beam antennas coupled directly to the NR transceiver with vertical polarization;

(8) One to many fixed beam antennas coupled directly to the NR transceiver with vertical polarization combined with one to many fixed beam antennas with horizontal polarization;

(9) One to many fixed beam antennas with polarization coupled via a switch to a power divider which itself is coupled to any of the above combinations of phased arrays listed in items (1) through (4);

(10) One to many fixed beam antennas with horizontal polarization coupled via a switch to a power divider which itself is coupled to any of the above combinations of phased arrays listed in items (1) through (4);

(11) One to many fixed beam antennas with vertical polarization coupled via a switch to a power divider which itself is coupled to any of the above combinations of phased arrays listed in items (1) through (4);

(12) One to many fixed beam antennas with horizontal polarization combined with one to many fixed beam antennas with horizontal polarization, each of which is coupled via a switch to a power divider which itself is coupled to any of the above combinations of phased arrays listed in items (1) through (4);

(13) Any one or more of the phased array antennas listed in items (1) through (4) combined with any one or more of the fixed beam antenna configurations specified in items (5) though (12).

(14) Any one or more of the above embodiments wherein circular polarization is used in place of the horizontal or vertical polarization of the fixed beam antennas or the phased array antennas.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to block diagrams of methods, apparatuses (systems) and computer program products according to embodiments of the disclosure. It will be understood that each block of the block diagrams, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer-readable non-transitory media includes all types of computer readable media, including magnetic storage media, optical storage media, and solid-state storage media and specifically excludes signals. It should be understood that the software can be installed in and sold with the device. Alternatively, the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

Computer-readable storage media (medium) exclude (excludes) propagated signals per se, can be accessed by a computer and/or processor(s), and include volatile and non-volatile internal and/or external media that is removable and/or non-removable. For the computer, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Disclosed herein is a mobile device, comprising: a modem; a millimeter wave transceiver coupled to the modem and a hybrid antenna array comprising a steering beam phased array antenna and a fixed beam antenna.

The mobile device may include the aforementioned mobile device wherein the hybrid antenna array includes a vertically polarized steering beam phased array antenna or a horizontally polarized steering beam phased array antenna.

The mobile device may include any of the aforementioned mobile devices 100 wherein the hybrid antenna array includes a vertically polarized fixed beam antenna or a horizontally polarized fixed beam fixed beam antenna.

The mobile device may include any of the aforementioned mobile devices wherein the hybrid antenna array and transceiver are provided in a front-end module.

The mobile device may include any of the aforementioned mobile devices wherein the housing includes a first side having a display and a second side, wherein the fixed beam antenna is provided in a region of the first side not including the display.

The mobile device may include any of the aforementioned mobile devices wherein the fixed beam antenna is coupled to a transmission power amplifier and a receiving low noise amplifier both coupled to an antenna aerial, the transmission power amplifier having higher output power in comparison to an output power amplifier attached to array element of steering beam phased array antenna.

The mobile device may include any of the aforementioned mobile devices wherein the steering beam phased array antenna includes a phase shifter, the output power amplifier, receiving low noise amplifier and switching elements coupling the phase shifter to the low noise amplifier or the output power amplifier.

The mobile device may include any of the aforementioned mobile devices wherein the transceiver and the antenna array are provided in a single module.

Also disclosed is an electronic circuit for a mobile device, comprising: a power divider; and a hybrid antenna array coupled to a millimeter spectrum transceiver via the power divider, the hybrid antenna array comprising a steering beam phased array antenna provided on a front-end module, and a fixed beam antenna.

The electronic circuit may include the aforementioned electronic circuits wherein the fixed beam antenna includes a transmission power amplifier and a receiving low noise amplifier both coupled to an antenna port.

The electronic circuit may include any of the aforementioned electronic circuits wherein the steering beam phased array antenna provided is provided on a front-end module, and the fixed beam antenna is provided on the front-end module.

The electronic circuit may include any of the aforementioned electronic circuits wherein the steering beam phased array antenna includes a phase shifter, output power amplifier, receiving low noise amplifier and switching elements coupling the phase shifter to the low noise amplifier, the transmission power amplifier having higher output power in comparison to the output power amplifier attached to an array element of the steering beam phased array antenna.

The electronic circuit may include any of the aforementioned electronic circuits wherein the hybrid antenna array includes a vertically polarized steering beam phased array antenna or a horizontally polarized steering beam phased array antenna, and a vertically polarized fixed beam antenna or a horizontally polarized fixed beam antenna.

The electronic circuit may include any of the aforementioned electronic circuits wherein the steering beam phased array antenna is provided on the front-end module, and the fixed beam antenna provided on a second front-end module.

The electronic circuit may include any of the aforementioned electronic circuits wherein the hybrid antenna array includes a vertically polarized steering beam phased array antenna or a horizontally polarized steering beam phased array antenna; and the second front-end module wherein the hybrid antenna array includes a vertically polarized fixed beam antenna or a horizontally polarized fixed beam antenna.

The electronic circuit may include any of the aforementioned electronic circuits wherein the steering beam phased array antenna is provided on a front-end module, and the fixed beam antenna provided on a PCB board.

The electronic circuit may include any of the aforementioned electronic circuits wherein the hybrid antenna array includes a vertically polarized steering beam phased array antenna or a horizontally polarized steering beam phased array antenna, and the fixed beam antenna provided on a PCB board includes a vertically polarized fixed beam antenna or a horizontally polarized fixed beam antenna.

Also disclosed is an electronic circuit provided in a module, comprising a millimeter wave spectrum modem; a millimeter wave transceiver coupled to the modem; and a hybrid antenna array coupled to the transceiver, the hybrid antenna array comprising a steering beam phased array antenna and a fixed beam antenna.

The electronic circuit may include the aforementioned electronic circuit wherein the fixed beam antenna includes a power amplifier and a low noise amplifier, the power amplifier having higher output power in comparison to power amplifier attached to array element of steering beam phased array antenna.

The electronic circuit may include any of the aforementioned electronic circuits wherein the circuit is provided in a housing, the housing includes a first side having a display and a second side, wherein the fixed beam antenna is provided in a region of the first side not including a display.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile device, comprising:
   a modem;
   a millimeter wave transceiver coupled to the modem; and
   a hybrid antenna array coupled to the transceiver, the hybrid antenna array comprising
   a mixer stage including at least one amplifier;
   a power divider coupled to the mixer stage;
   a steering beam phased array antenna coupled to the power divider, the phased array antenna comprising a plurality of array elements, each array element coupled to a first output amplifier and a first receiving amplifier; and
   at least one fixed beam antenna comprising a transmit channel including a second output amplifier and a receive channel including a second receiving amplifier coupled to the power divider, the second output amplifier having a higher output power than the first output amplifier and the second receiving amplifier having a lower noise factor than a noise factor of the first receiving amplifier.

2. The mobile device of claim 1 wherein the hybrid antenna array includes a vertically polarized steering beam phased array antenna or a horizontally polarized steering beam phased array antenna.

3. The mobile device of claim 1 wherein the hybrid antenna array includes a vertically polarized fixed beam antenna or a horizontally polarized fixed beam fixed beam antenna.

4. The mobile device of claim 1 wherein the first and second receiving amplifiers comprise low noise amplifiers.

5. The mobile device of claim 4 wherein the mobile device includes a housing comprising a first side having a display and a second side opposing the first side, wherein the at least one fixed beam antenna is provided abutting the first side in a region of the first side not including the display and at least a portion of the plurality of array elements is provided abutting the second side.

6. The mobile device of claim 5 wherein each element of the steering beam phased array antenna includes a phase shifter, the first output amplifier, the first receiving amplifier and switching elements coupling the phase shifter to the first receiving amplifier or the first output amplifier.

7. The mobile device of claim 1 wherein the transceiver and the hybrid antenna array are provided in a single front-end module.

8. An electronic circuit for a mobile device, comprising:
   a mixer stage including at least one amplifier;
   a power divider coupled to the mixer stage;
   a steering beam phased array antenna coupled to the power divider, the phased array antenna including a plurality of array elements, each array element coupled to a first output amplifier and a first receiving amplifier; and
   a fixed beam antenna including at least one antenna element adapted to be coupled to an output channel having a second output amplifier and a receive channel having a second receiving amplifier, and the power divider, the second output amplifier having a higher output power than the first output amplifier and the second receiving amplifier having a lower noise factor than a noise factor of the first receiving amplifier.

9. The electronic circuit of claim 8 wherein the fixed beam antenna includes the second output amplifier and the second receiving amplifier, both coupled to an antenna port.

10. The electronic circuit of claim 8, wherein the steering beam phased array antenna provided is provided on a front-end module, and the fixed beam antenna is provided on the front-end module.

11. The electronic circuit of claim 10 wherein each steering beam phased array antenna includes, for each antenna element, a phase shifter, the first output amplifier, the first receiving amplifier and switching elements coupling the phase shifter to the first receiving amplifier and the first output amplifier.

12. The electronic circuit of claim 10 wherein steering beam phased array antenna includes a vertically polarized steering beam phased array antenna or a horizontally polarized steering beam phased array antenna, and wherein the fixed beam antenna includes a vertically polarized fixed beam antenna or a horizontally polarized fixed beam antenna.

13. The electronic circuit of claim 8 wherein the steering beam phased array antenna is provided on a first front-end module, and the fixed beam antenna provided on a second front-end module.

14. The electronic circuit of claim 13 wherein the steering beam phased array antenna includes a vertically polarized steering beam phased array antenna or a horizontally polarized steering beam phased array antenna and wherein the fixed beam antenna includes a vertically polarized fixed beam antenna or a horizontally polarized fixed beam antenna.

15. The electronic circuit of claim 8 wherein the steering beam phased array antenna is provided on a front-end module, and the fixed beam antenna provided on a PCB board.

16. The electronic circuit of claim 15 wherein the electronic circuit includes a vertically polarized steering beam phased array antenna or a horizontally polarized steering beam phased array antenna, and the fixed beam antenna provided on a PCB board includes a vertically polarized fixed beam antenna or a horizontally polarized fixed beam antenna.

17. An electronic circuit, comprising:
a millimeter wave spectrum modem;
a millimeter wave transceiver coupled to the modem; and
a hybrid antenna array coupled to the transceiver, the hybrid antenna array comprising
a mixer stage including at least one amplifier;
a power divider;
a steering beam phased array antenna and coupled to the power divider, the phased array antenna including a plurality of array elements, each element coupled to a first output amplifier and a first receiving amplifier; and
a fixed beam antenna including at least one antenna element adapted to be coupled to an output channel having a second output amplifier and a receive channel having a second receiving amplifier coupled between an antenna element and the power divider, the second output amplifier having a higher output power than the first output amplifier and the second receiving amplifier having a lower noise factor than a noise factor of the first receiving amplifier.

18. The electronic circuit of claim 17 wherein the receiving amplifiers have a lower noise in comparison to any of the first and second output amplifiers.

19. The electronic circuit of claim 17 wherein the circuit is provided in a housing, the housing includes a first side having a display and a second side opposing the first side, wherein the fixed beam antenna is provided abutting the first side in a region of the first side not including a display, and at least a portion of the plurality of array elements is provided abutting the second side.

* * * * *

UNITED STATES PATENT AND TRADEMARK OFFICE
CERTIFICATE OF CORRECTION

PATENT NO. : 10,581,164 B2
APPLICATION NO. : 16/002212
DATED : March 3, 2020
INVENTOR(S) : X. He et al.

Page 1 of 1

It is certified that error appears in the above-identified patent and that said Letters Patent is hereby corrected as shown below:

On the Title Page

Item (57), Column 1, Lines 7, 8, please change "a mobile devices" to --a mobile device--.

In the Claims

Column 16, Line 15 (Claim 3, Line 3), please change "fixed beam fixed beam" to --fixed beam--.

Signed and Sealed this
Twenty-first Day of July, 2020

Andrei Iancu
*Director of the United States Patent and Trademark Office*